(12) United States Patent
Steffey et al.

(10) Patent No.: US 7,621,236 B2
(45) Date of Patent: Nov. 24, 2009

(54) FOLDING PET RAMP AND STEPS (75) Inventors: Sue Steffey, Ipswich, MA (US); Brooks Rorke, Guilford, CT (US)

(73) Assignee: PetEdge

( * ) Notice: Subject to any disclaimer, the term of this patent is extended or adjusted under 35 U.S.C. 154(b) by 250 days.

(21) Appl. No.: 11/758,906

(22) Filed: Jun. 6, 2007

(65) Prior Publication Data

US 2008/0302312 A1 Dec. 11, 2008

(51) Int. Cl.
*A01K 29/00* (2006.01)
(52) U.S. Cl. .................. 119/847; 182/180.1; 14/69.5; 14/71.1; 52/182
(58) Field of Classification Search ............. 52/7, 52/183, 182; 14/69.5; 182/180.1; 119/847
See application file for complete search history.

(56) References Cited

U.S. PATENT DOCUMENTS

| | | | | |
|---|---|---|---|---|
| 4,580,776 A * | 4/1986 | Burkinshaw | ............ | 52/7 |
| 4,848,515 A | 7/1989 | Rinke | ............ | 182/20 |
| 4,991,691 A * | 2/1991 | Brawer et al. | ............ | 182/106 |
| 5,224,723 A * | 7/1993 | Hatas | ............ | 280/166 |
| 5,454,196 A * | 10/1995 | Gaines et al. | ............ | 52/183 |
| 5,634,440 A * | 6/1997 | Mogck | ............ | 119/847 |
| 5,941,342 A * | 8/1999 | Lee | ............ | 182/95 |
| 6,189,653 B1 | 2/2001 | Laug | ............ | 182/152 |
| 6,764,123 B1 | 7/2004 | Bilyard | ............ | 296/61 |
| 7,159,261 B2 * | 1/2007 | Carrigan | ............ | 14/71.1 |
| 7,383,600 B2 * | 6/2008 | Carrigan | ............ | 14/71.1 |
| 2003/0051299 A1 * | 3/2003 | Bearint | ............ | 14/69.5 |
| 2005/0056233 A1 * | 3/2005 | O'Leary et al. | ............ | 119/753 |
| 2005/0235437 A1 * | 10/2005 | Carrigan | ............ | 14/69.5 |
| 2006/0006023 A1 * | 1/2006 | Lim | ............ | 182/127 |
| 2006/0245883 A1 * | 11/2006 | Fontaine et al. | ............ | 414/537 |
| 2007/0101516 A1 * | 5/2007 | Carrigan | ............ | 14/69.5 |

OTHER PUBLICATIONS dobaWayback01162007.pdf; "Fold-away pet steps and ramp in one" furnished by www.doba.com viewed in the wayback machine (http://www.archive.org/index.php) dated to Jan. 16, 2007. Exact hyperlink to webarchive link: http://web.archive.org/web/*/http://www.doba.com/catalog/393667.html.*

Pet Classics LLC, Climber Slope Bed Ramp advertisement with photos www.petclassics.com.

Pet Classics LLC, 7 Foot Extra-Long folding Dog Ramp advertisement with photos www.petclassics.com.

(Continued)

*Primary Examiner*—Richard E Chilcot, Jr.
*Assistant Examiner*—Alp Akbasli
(74) *Attorney, Agent, or Firm*—Sunstein Kann Murphy & Timbers LLP (57) ABSTRACT

A folding pet ramp and step apparatus is described. The apparatus includes a frame supporting an upper platform member and a lower platform member. The lower platform member has a lower riser and a lower runner. The upper platform member has an upper riser and an upper runner which are movable between a ramp mode and a step mode. The upper riser fixedly supports the upper runner against the frame when in the step mode, and is moveable from the fixedly supported position to permit the upper runner to move to the ramp mode.

20 Claims, 11 Drawing Sheets

OTHER PUBLICATIONS

Pet Classics LLC, Folding Dog Stairs advertisement with photos www.petclassics.com.

Lucky Pet Furniture, Cat and Dog Step advertisement with photos.

Lucky Pet Furniture, Pet Stairs Three Step advertisement with photos.

HandicappedPets.com, Advertisement for products, services and support for elderly, disabled, and handicapped pets with photos and instructions.

HandicappedPets.com, Advertisement for Pet Steps, Ramps and Stairs for elderly, disabled, and handicapped pets with photos.

ACE CatFurniture.com, Advertisement for Pet Steps with photos.

\* cited by examiner

FOLDING PET RAMP AND STEPS

FIELD OF THE INVENTION

The invention generally relates to folding steps. More specifically, the invention relates to a folding set of steps for pets that can convert into a ramp or a combination of a ramp and steps.

BACKGROUND ART

In today's society pet-owners treat their pets more and more like family members and preventative medicine is helping pets live longer, healthier lives. However, despite the state of veterinarian medicine and the willingness of pet owners to expend money to help their pets live longer, many older and smaller pets have mobility issues that keep them from getting into cars, and onto furniture such as beds and couches.

Figure 1A:
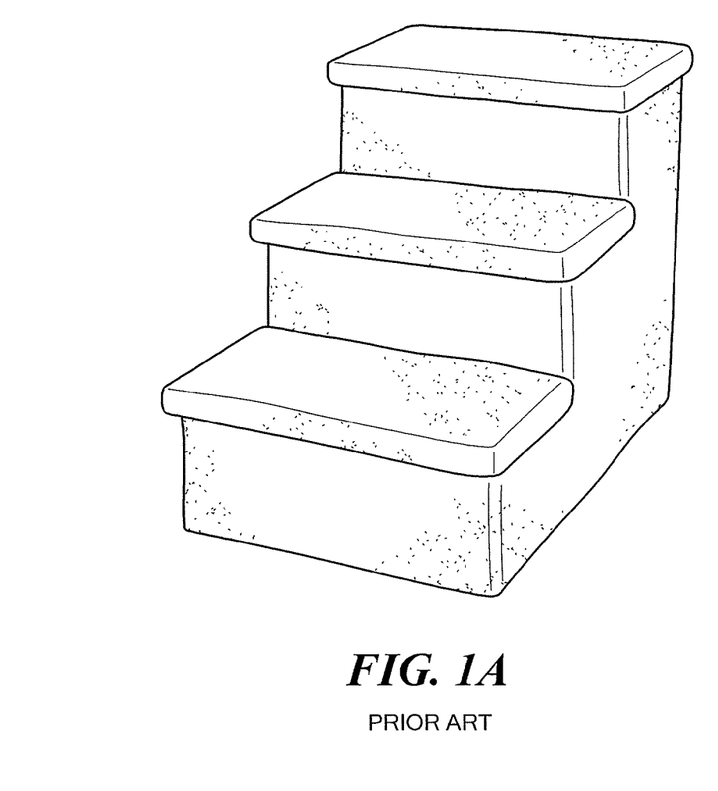
FIGS. 1A and 1B show prior art pet step devices that are currently on the market.
Figure 1B:
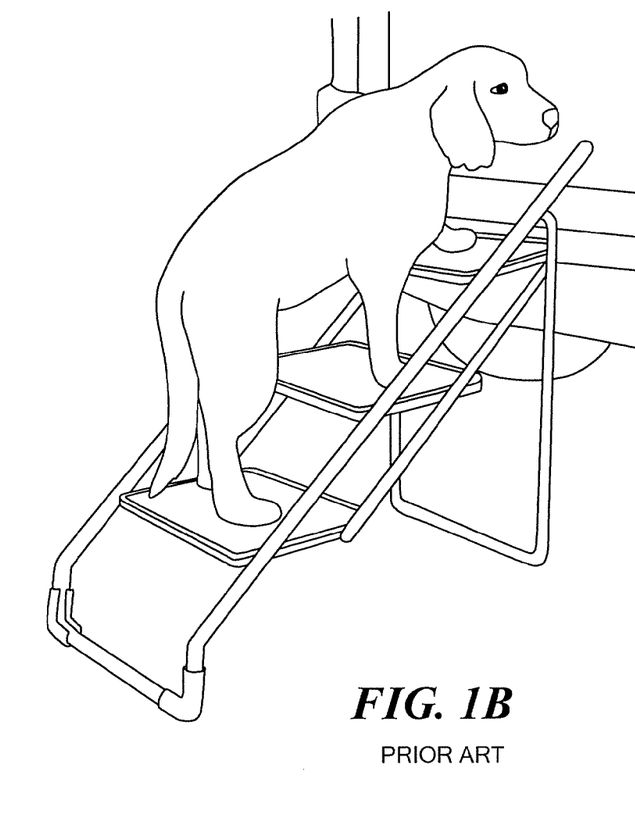
Figure 1C:
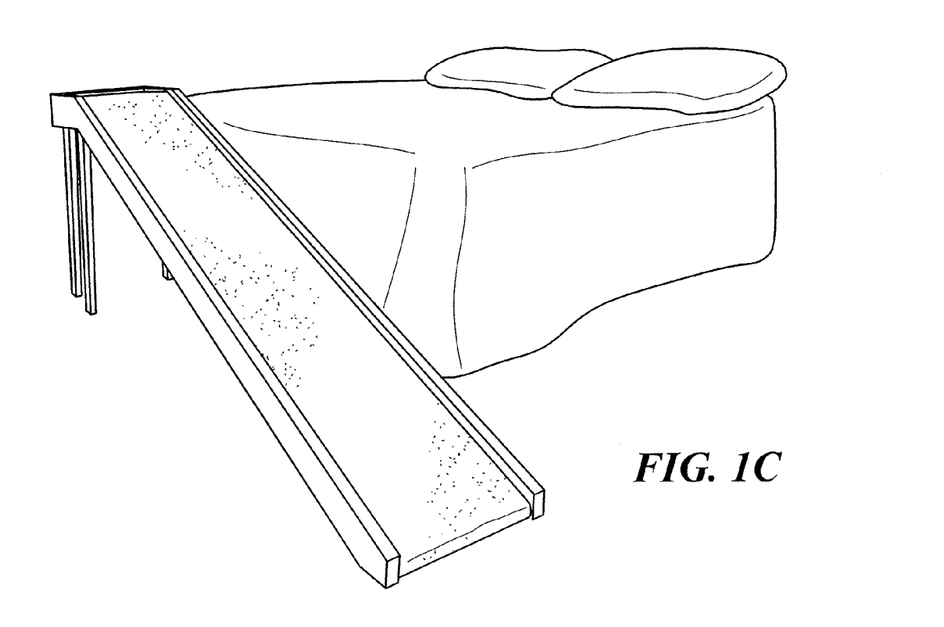
FIGS. 1C and 1D show prior art pet ramp devices that are currently on the market.

As shown in FIGS. 1A, 1B, and 1C, there are currently several commercially available options to help smaller and/or geriatric animals get into cars and onto furniture. For example, FIG. 1 shows an exemplary set of carpeted pet stairs. Although suitable for helping pets get onto furniture, the steps are a solid structure and cannot be folded down for storage. FIG. 1B shows an alternative type of pet steps that are designed to help animals get into automobiles. Although these pet steps are foldable, storable, and transportable, they are primarily meant for outdoor use.

Figure 1D:
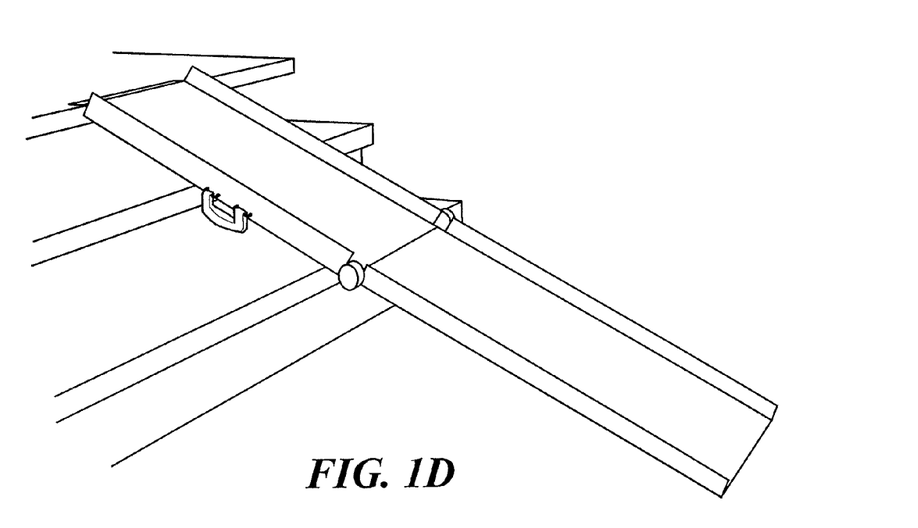

In addition to the pet steps described above, there are currently a variety of pet ramps on the market that serve similar purposes. Exemplary prior art pet ramps are shown in FIGS. 1C and 1D. Although many of currently available ramp devices are foldable (FIG. 1D) and easily stored, there are several drawbacks to these pet ramps. First, many pets may be afraid to walk up the pet ramp because the ramp is either too steep or the animal is just not accustomed to walking up ramps. Additionally, the ramps typically need a fairly significant area to ensure that the ramp will fit and that the ramp is not so steep that the animal will have difficulty climbing it.

SUMMARY OF THE INVENTION

Embodiments of the present invention are directed towards a pet step and ramp apparatus. The apparatus may include a frame that supports a lower platform member and an upper platform member. The lower platform member has a lower riser and a lower runner. The upper platform has an upper riser and an upper runner which are movable between a ramp mode and a step mode. The upper riser fixedly supports the upper runner against the frame when in the step mode, and is moveable from the fixedly supported position to permit the upper runner to move to the ramp mode.

In accordance with some embodiments, the lower riser and lower runner may be movable between a ramp mode and a step mode. In such embodiments, the lower riser fixedly supports the lower runner against the frame when in the step mode, and is moveable from the fixedly supported position to permit the lower runner to move to the ramp mode.

The apparatus can be configured such that one of the platform members is in the ramp position and one is in the step position, creating a ramp/step combination. For example, the upper platform member may be in the ramp position and the lower platform member may be in the step position. Alternatively, the upper platform member may be in the step position and the lower platform member may be in the ramp position.

In accordance with still other embodiments of the present invention, the frame may include a left and right support member, and at least one cross support. The cross support may extend from the left support member to the right support member and provide rigidity to the frame. The cross support(s) may also include a slot that can receive a flange that may be located on the upper riser. The flange can hold the platform in the step position when it is inserted into the slot.

The upper platform member may also include a latching mechanism that releasably locks the upper platform member in the ramp position. The latching mechanism can be a spring loaded ball that can retract into a recess and release the upper platform member.

The apparatus's overall length may be fixed, regardless of whether it is in the step, ramp, or folded position. The apparatus may also include a middle platform member having a middle riser and a middle runner. The middle riser and middle runner may be movable between a ramp mode and a step mode, and the middle riser may fixedly support the middle runner against the frame when in the step mode. Moreover, the middle riser may be moveable from the fixedly supported position to permit the middle runner to move to the ramp mode.

Embodiments containing a middle platform member may also be configured such that one or two of the platform members is/are in the ramp position and other(s) are in the step position, creating a ramp/step combination. For example, the upper and middle platform members may be in the ramp position and the lower platform member may be in the step position. Alternatively, the upper and middle platform members may be in the step position and the lower platform member may be in the ramp position. Additionally, the upper platform member may be in the ramp position and the middle and lower platform members may be in the step position. Also, the upper platform member may be in the step position and the middle and lower platform members may be in the ramp position.

In accordance with other embodiments of the present invention the apparatus may also include foldable leg support member located at one end of the frame. The leg support member can have a folded-out and a folded-in position. The foldable support member orients the apparatus at an angle when in the folded-out position.

In accordance with other embodiments of the present invention, the apparatus may also include a handle for carrying the apparatus. The handle may be located on the frame. Additionally, the upper and lower platform members may be carpeted.

DETAILED DESCRIPTION OF SPECIFIC EMBODIMENTS

Embodiments of the present invention provide an apparatus that allows geriatric and/or smaller pets to get onto furniture and into automobiles with ease. Specific embodiments include several platform members and a frame that provide an apparatus that can be configured as a set of steps, a ramp, or a combination of the two. Each platform member includes a runner and riser that supports the runner in the step position.

Figure 2:
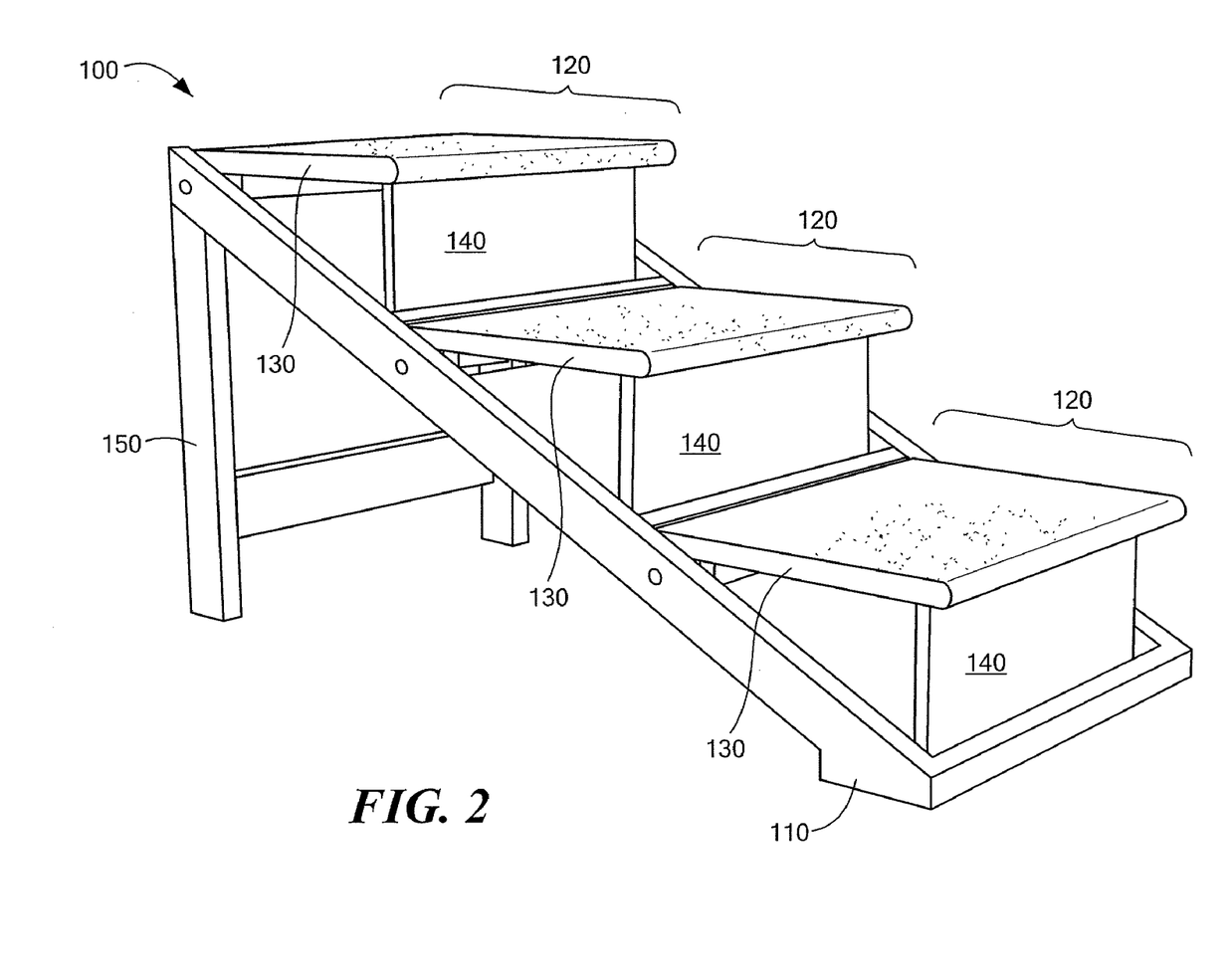
FIG. 2 schematically shows an exemplary pet step/ramp apparatus configured in the step mode in accordance embodiments of the present invention.
Figure 3:
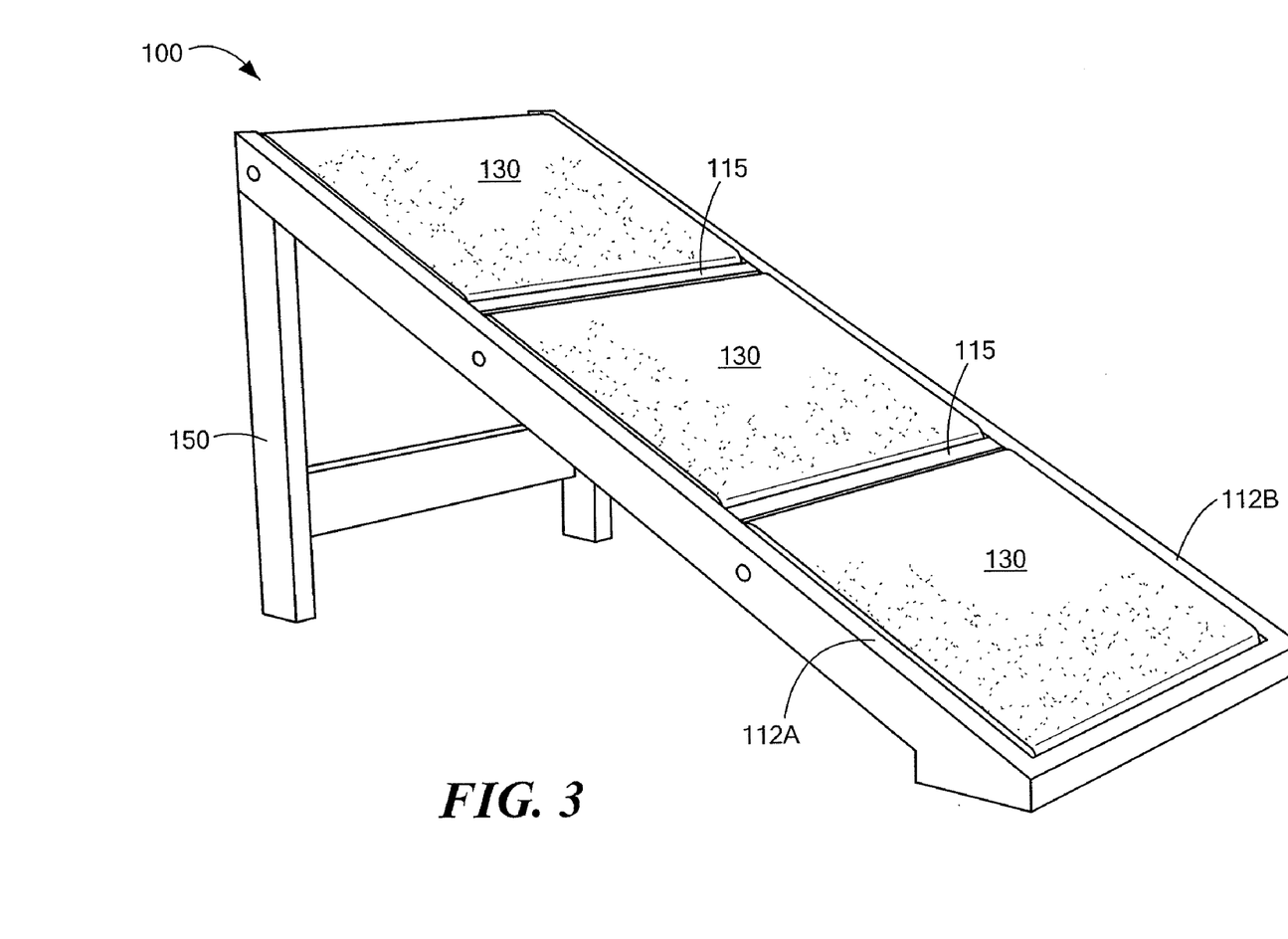
FIG. 3 schematically shows an exemplary pet step/ramp apparatus configured in the ramp mode in accordance embodiments of the present invention.
Figure 6A:
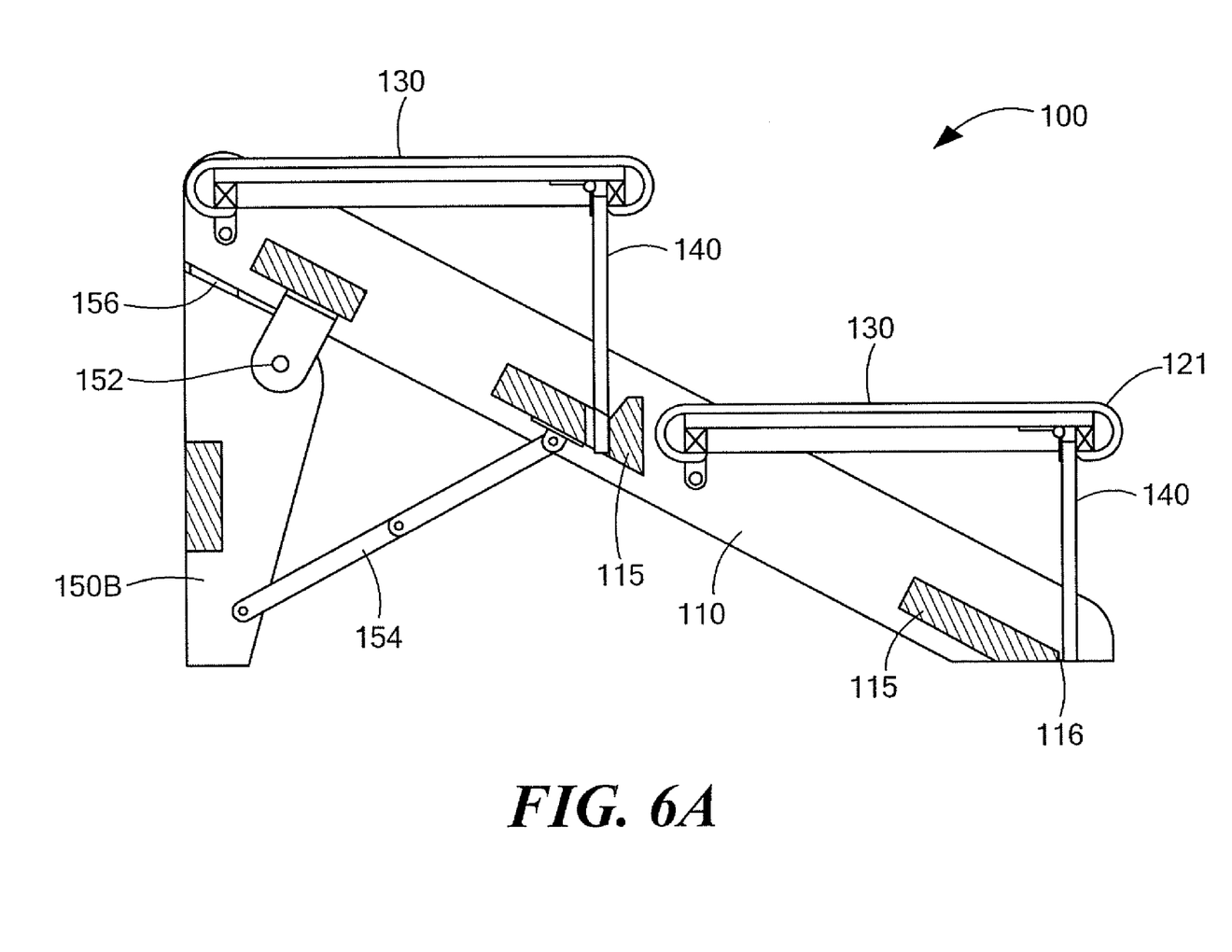
FIG. 6A schematically shows a section view of a two-step apparatus in accordance with embodiments of the present invention.

FIG. 2 shows a pet step/ramp apparatus 100 in accordance with the present invention. As mentioned above, the system can be configured as a set of steps (FIG. 2), as a ramp (FIG. 3), or as a combination of the two (not shown). In any orientation, the apparatus includes a plurality of platform members 120 that a user can position into either a step mode (FIG. 2) or a ramp mode (FIG. 3). It is important to note that, although FIGS. 2 and 3 show an embodiment containing 3 steps, an apparatus in accordance with this invention can include more or less platform members 120. For Example, as shown in FIG. 6A (discussed in greater detail below), the apparatus can have two platform members 120. Alternatively, the apparatus 100 can have four or more platform members 120.

The apparatus also includes a frame 110 that supports the platform members 140. The frame may include left and right support members 112A/B and cross support members 115 that add rigidity to the frame. As discussed in greater detail below, the cross support members 115 may also help support the platform members 120 in the step position shown in FIG. 2. In addition, the apparatus may also have a leg support member 150A/B located at one end of the apparatus 100. The leg support member 150A/B can be foldable (150B) and can be used to angle and support the frame 110 in either the step or ramp configurations.

Figure 4A:
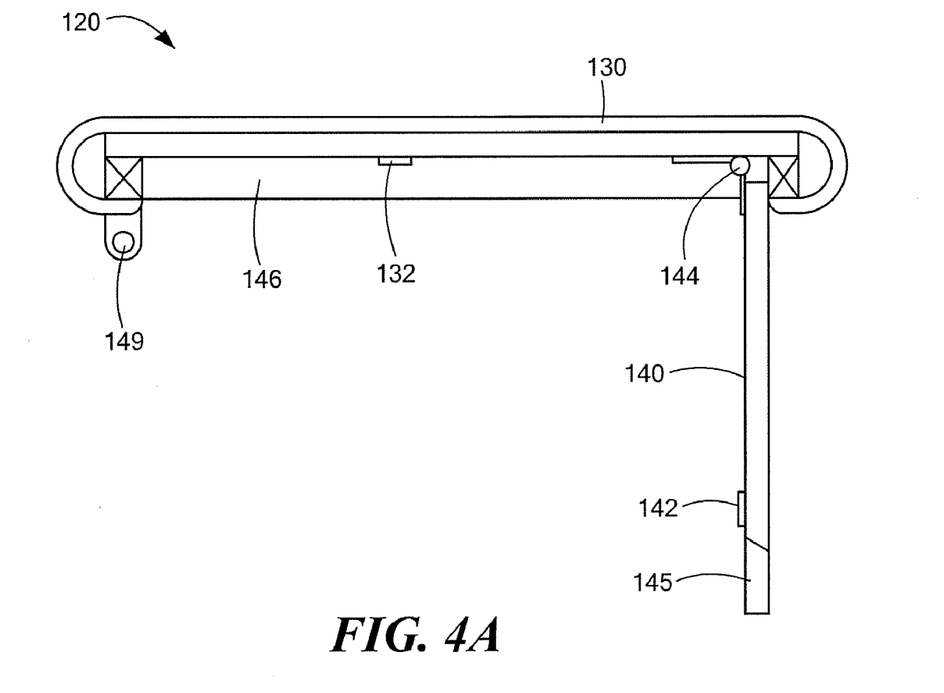
FIG. 4A schematically shows an exemplary platform member with riser unfolded in accordance with embodiments of the present invention.
Figure 4B:
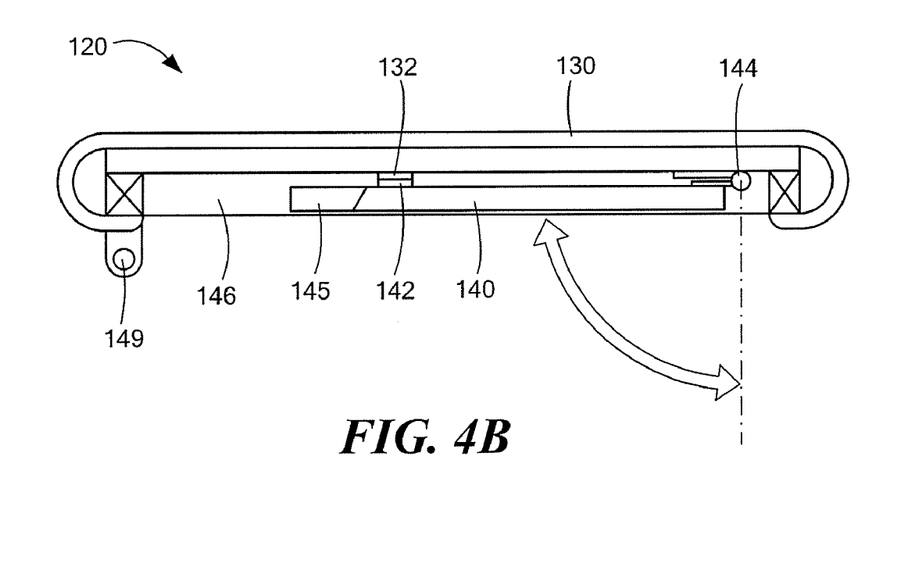
FIG. 4B schematically shows an exemplary platform member with riser folded-in in accordance with embodiments of the present invention.

As generally shown in FIG. 2 and as shown in greater detail in FIGS. 4A and 4B, each of the platform members 120 has a runner 130 and a riser 140. The runner 130 is the horizontal portion upon which the user (e.g., the pet) steps, and the riser 140 is the vertical portion that acts to support the runner 130 when in the step mode. To facilitate the transition between the step and ramp modes, the riser 140 may be attached to the runner using a riser hinge 144 that permits the riser 140 to pivot with respect to the runner 130. Therefore, when the platform member 120 is in the step position, as shown in FIG. 4A, the riser 140 is substantially perpendicular to the runner 130. To transition to the ramp position shown in FIG. 4B, the riser 140 can pivot about the riser hinge 144 and fold under the runner 140.

In some embodiments, the runner 130 may have a recess 146 for receiving the riser 140 when in the ramp mode. The recess 146 may be located on the underside of the runner 130. To prevent the riser 140 from inadvertently swinging out, the riser 140 and runner 130 can have latching mechanisms. For example, the riser 140 and the runner 130 can each have a magnet 142 and 132, respectively, that come into contact with one another when the user folds the riser 140 into the recess 146. Although a set of magnets 132/142 is described, any latching mechanism that is capable of holding the riser 140 in place is within the scope of this invention. As discussed in greater detail below, the riser 150 may also have a flange 145 that can be inserted into a slot 117 (FIG. 5) within a cross support member 115. When inserted into the slot 117, the flange 145 holds the associated platform member 120 in the step position.

Each platform member 120 may be connected to the frame 110 using a platform hinge. The platform hinge can be a standard hinge or it can be a pivot tab 149 that pivots about a rod (not shown) located on the frame 110 or the leg support member 150A/B. The platform hinge allows the platform member 120 to transition between the step and ramp positions.

Figure 4C:
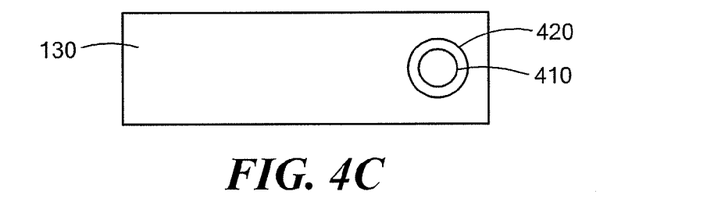
FIGS. 4C-4E schematically shows an exemplary locking mechanism for locking the platform member in the ramp mode in accordance with embodiments of the present invention.
Figure 4D:
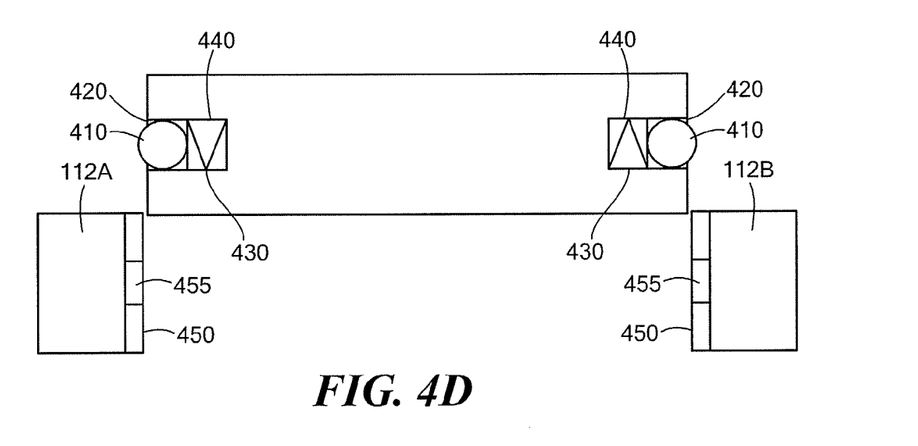
Figure 4E:
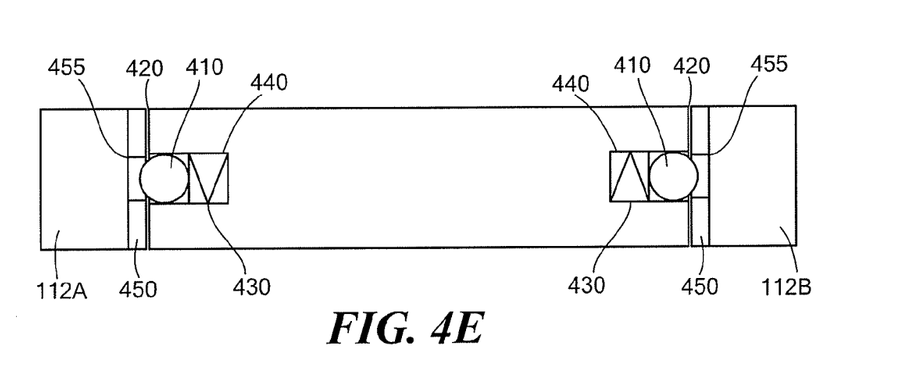

As shown in FIGS. 4C-4E, each of the platform members 120 may also have a spring loaded locking mechanism located in the runner. The spring loaded locking mechanism may lock the runner in the ramp position. The spring loaded locking mechanism may include a ball 410 located in a bore 440 positioned near the edge of the runner 130. A spring loaded locking mechanism can be located on both sides of the runner 130 (see FIGS. 4D and 4E). A spring located within the bore 440 biases the ball 410 outwards, and allows the ball to retract into the bore 440. A retaining ring 420 with an outer diameter substantially equal to the diameter of the bore 440 and an inner diameter smaller than that of the diameter of the ball 410 prevents the ball 410 from falling out of the bore 440.

The left and right frame support members 112A/B each may include a plate 450 with a hole 455 for receiving the ball 410, and locking the platform member 120 in the ramp position. Therefore, as the user lowers the platform member 120 into the ramp position, the ball 410 will contact the plate 450 and begin to retract into the recess 440. When the ball reaches the hole 455, the spring 430 will bias the ball 410 outwards, and the ball will snap into the hole 455. When the ball 410 engages with the hole 455, the platform member 120 is essentially locked in the ramp position. When a user wishes to transition the platform member 120 from the ramp position back to the step position, they need only lift the platform member 120 to disengage the spring loaded locking mechanism. As the platform member 120 is lifted, the ball 410 will once again retract into the bore 440 and, once the platform member has cleared the frame 110 and plate 450, the spring 430 will bias the ball back out. The user can then unfold the riser 130 and insert the flange 145 into the slot 117 in the corresponding cross support member 115.

Figure 5:
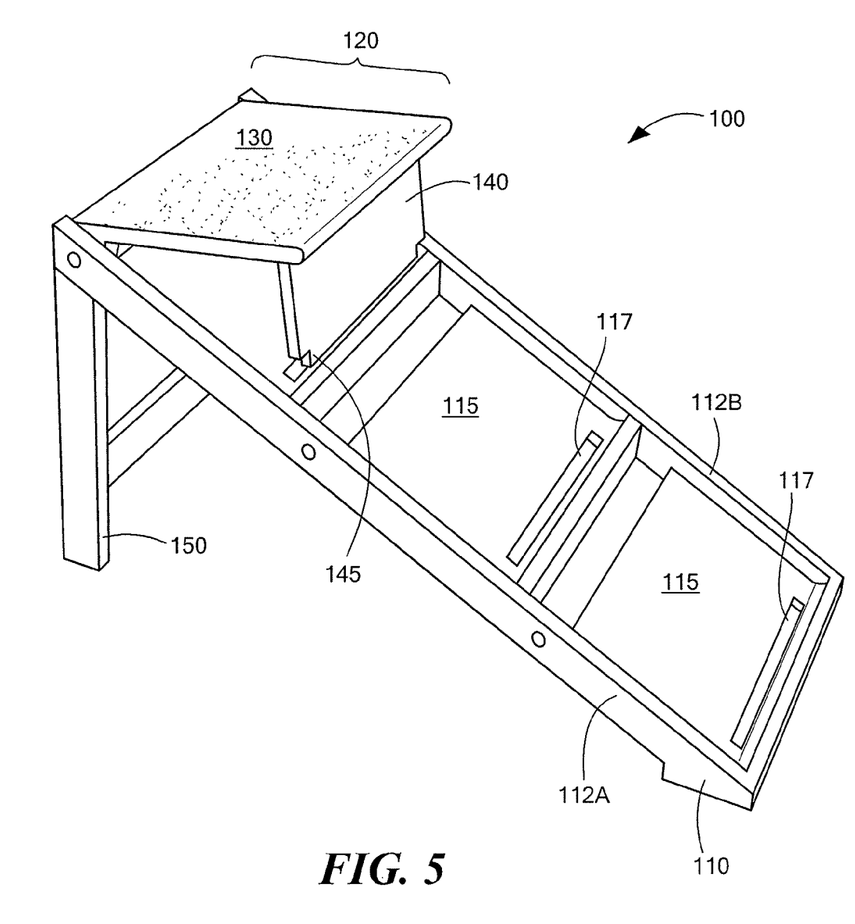
FIG. 5 schematically shows an exemplary apparatus with two platform members removed to illustrate the flange/slot interaction in accordance with embodiments of the present invention.

As mentioned above, each riser 140 may have flange that a user may insert into a slot 117 in the cross support member 115. FIG. 5 shows a three-step apparatus 110 with the bottom two platform members removed so that the interaction between the slot 117 and the flange 145 can be better illustrated. Specifically, as the user moves the platform member 120 into the step position, the user can remove the riser 140 from the recess 146 and pivot the riser 140 such that it is substantially perpendicular to the runner 130. The user may then insert the flange 145 into the slot 117 to hold the platform member 120 in the step mode. If the user wishes to change the mode back to the ramp mode, they need only lift the platform member causing the platform member to pivot about the platform hinge, remove the flange 145 from the slot 117, pivot the riser 140 such that it fold into the recess 146 in the runner 130, and lower the platform member 120. As the user lowers the platform member 120 into the frame 110, the spring loaded locking mechanism (e.g., the ball 410), will lock the platform in the ramp mode.

Figure 6B:
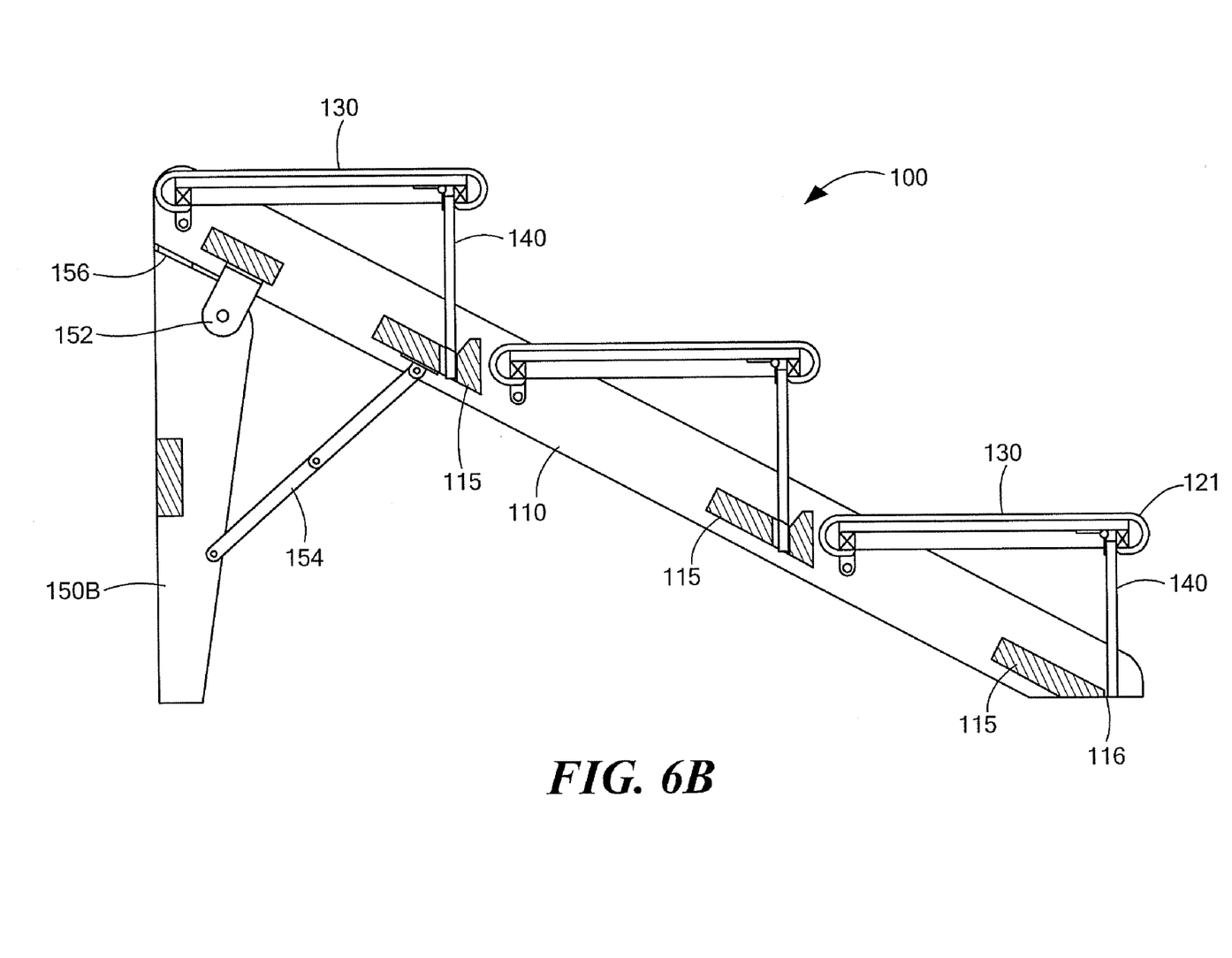
FIG. 6B schematically shows a section view of a three-step apparatus in accordance with embodiments of the present invention.

As mentioned above and as shown in FIGS. 6A (two-step) and 6B (three-step), the apparatus 100 can include a leg support member 150A/B that supports the frame 110 and apparatus in an angled position. The leg member can be stationary 150A (as shown in FIGS. 2 and 3), or the leg support member can be foldable 150B such that it can fold under the frame 115 to create a storable apparatus. The foldable leg member 150B can be foldably attached to the frame 115 in a variety of ways. For example, as shown in FIGS. 6A and 6B, the frame 115 can have a leg pivot tab 152 that interacts with a rod located on the foldable leg member 150B in a similar manner as the pivot tab located on the platform members. Additionally, the apparatus 100 may have a folding leg support 154 extending from the frame 110 to the foldable leg 150B to keep the foldable leg 150B in the extended position. In some embodiments, the leg support 150B may include a rubber stop 156 located at the top of the leg support member 150B. The rubber stop 156 can be located such that it lies between the top of the leg support 150B and the bottom of the frame 115. The rubber stop 156 will prevent wear between the leg support 150B and the frame 115. Additionally, the rubber stop 156 will act as somewhat of a shock absorber.

In alternative embodiments, the bottom platform member 121 may not have a flange 145 (FIGS. 6A and 6B). Instead, the riser 140 of the bottom platform member 121 may be trimmed such that it is flush with the bottom of the frame 115. In such embodiments, the end of the riser will sit on the floor as opposed to being inserted into to a cross support 115. The edge 116 of the bottom cross support member will prevent the riser 140 from accidentally folding in.

Figure 7:
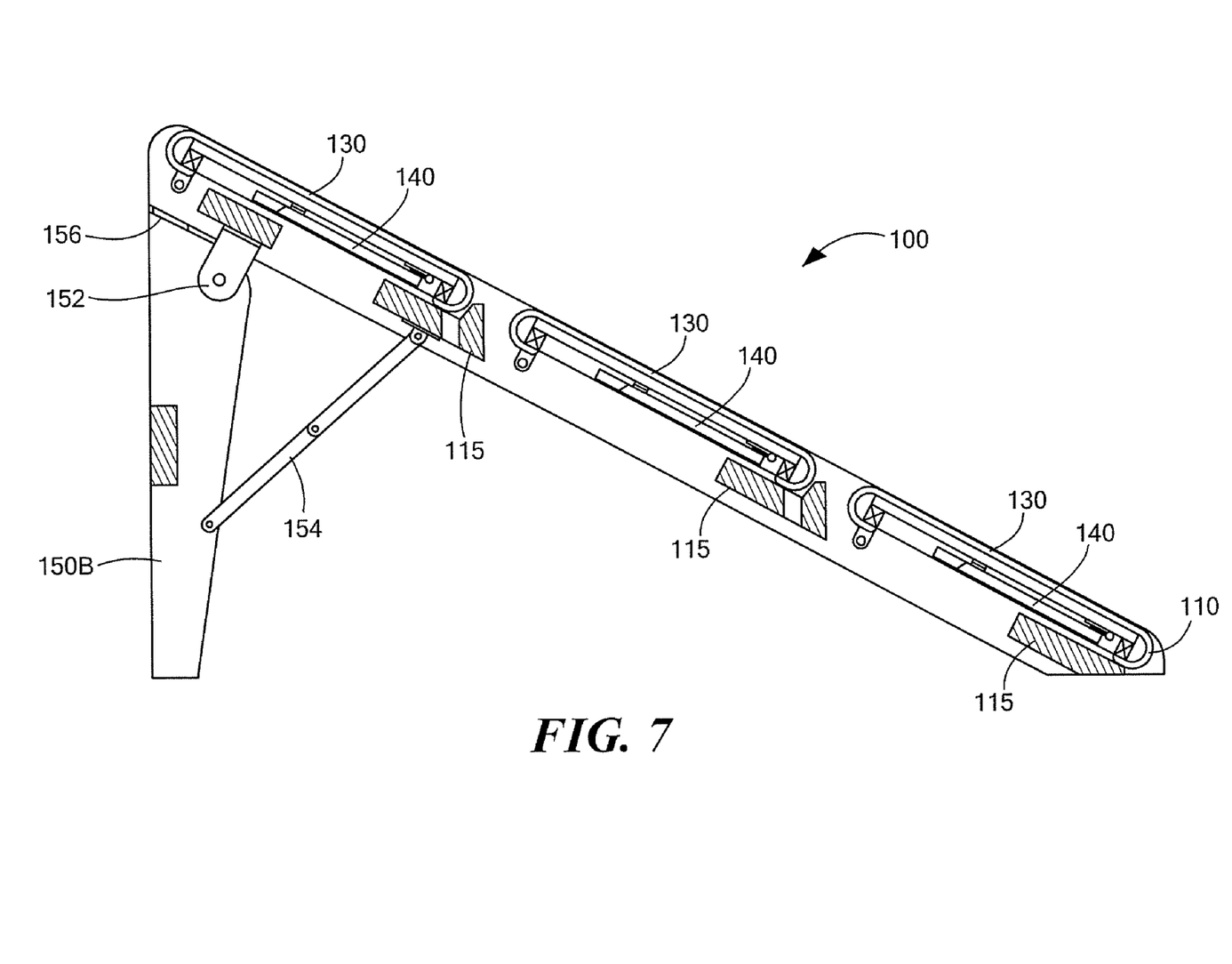
FIG. 7 schematically shows a section view of a three-step apparatus in the ramp mode in accordance with embodiments of the present invention.

FIGS. 6A, 6B, and 7 show the apparatus 100 in either a fully step mode or a fully ramp mode. However, this need not be the case. The user can configure the apparatus in a combination ramp/step orientation if needed. To do so, the user need only position the desired platform members 120 in the correct manner. For example, if the user wishes to have a single step leading into a ramp, the user can configure the bottom platform member in the step mode, and the remaining platform members in the ramp mode. Conversely, if the user wishes to have a ramp leading into steps, the user can simply configure the bottom platform member in the ramp mode, and the remaining platform members in the step mode.

Figure 8A:
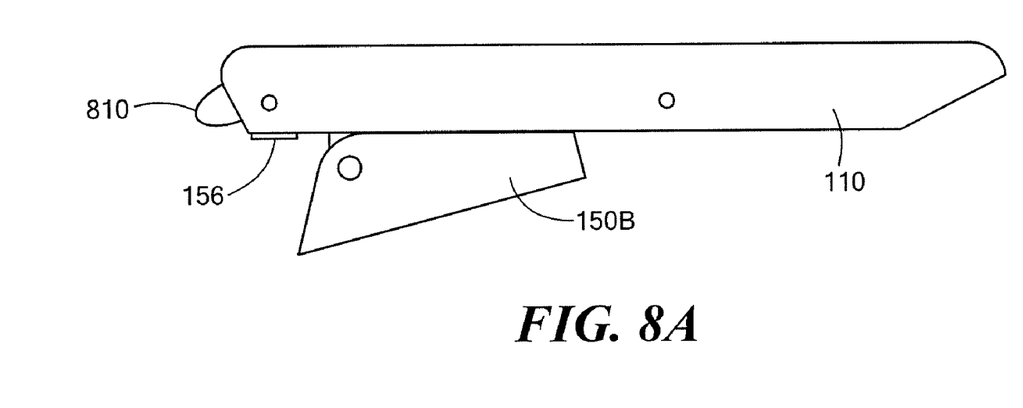
FIG. 8A schematically shows a side view of a two-step apparatus in the storage configuration in accordance with an embodiment of the air-pressure control system.
Figure 8B:
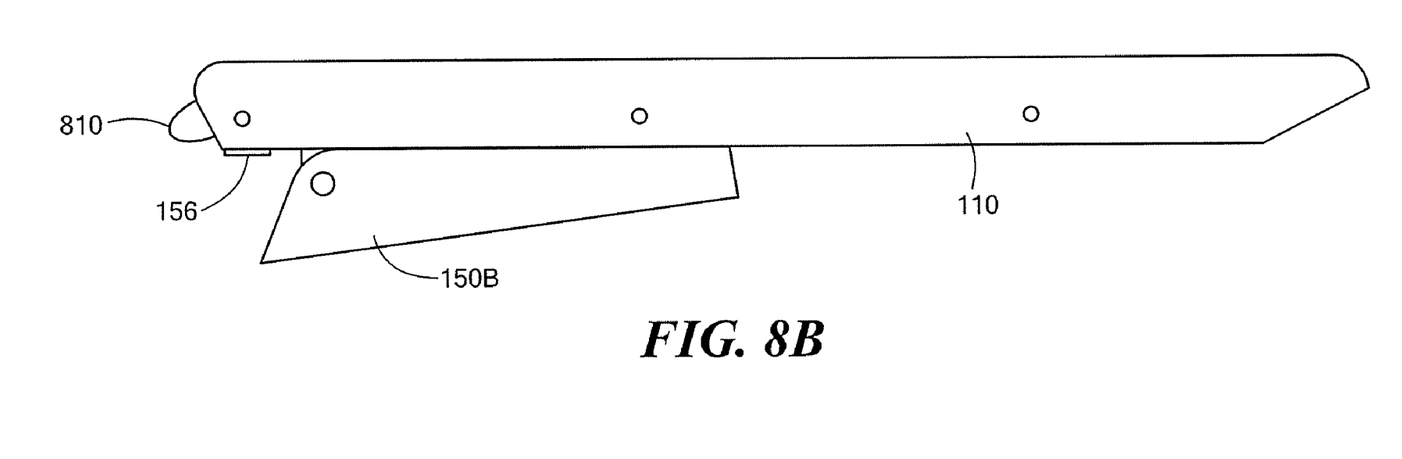
FIG. 8B schematically shows a side view of a three-step apparatus in the storage configuration in accordance with an embodiment of the air-pressure control system.

Once a user is done using the apparatus 100, the apparatus can be folded into a storage mode shown in FIGS. 8A (two-step) and 8B (three step). To do so, the user need only place all of the platform members 120 in the ramp mode and fold in the leg support member 150B. The apparatus can then easily be stored under a couch or bed or placed out of the way. It is important to note that, regardless of the mode (e.g., storage, ramp, step, or combination ramp/step), the overall length of the frame 110 and apparatus 110 remain the same.

The apparatus 100 may also include a handle 810 for transporting the apparatus 100. The handle 810 can be any number of materials including, but not limited to, metal, leather, rubber, rope, etc. Additionally, the handle 810 can be flexible or solid. Although FIGS. 8A and 8B show the handle 810 on the frame 110, the handle 810 can be located anywhere on the apparatus 100. For example, the handle 810 may also be located on a cross support 115 or the leg support member 150B.

It should be noted that any dimensions provided in the figures are for illustration purposes only and they are not meant to limit the size, shape, or configuration of any of the components described in this application. Components having different dimension are still within the scope of this invention.

Although various exemplary embodiments of the invention have been disclosed, it should be apparent to those skilled in the art that various changes and modifications can be made which will achieve some of the advantages of the invention without departing from the true scope of the invention.

What is claimed is:

1. An apparatus comprising:
a frame supporting an upper platform member and a lower platform member;
the lower platform member having a lower riser and a lower runner; and
the upper platform member having an upper riser and an upper runner which are movable between a ramp mode and a step mode, the upper riser:
(i) fixedly supporting the upper runner against the frame when in the step mode, and
(ii) being moveable from the fixedly supported position to permit the upper runner to move to the ramp mode.

2. An apparatus according to claim 1, wherein the lower riser and lower runner are movable between a ramp mode and a step mode, the lower riser:
(i) fixedly supporting the lower runner against the frame when in the step mode, and
(ii) being moveable from the fixedly supported position to permit the lower runner to move to the ramp mode.

3. An apparatus according to claim 2, wherein the upper platform member is in the ramp position and the lower platform member is in the step position.

4. An apparatus according to claim 2, wherein the upper platform member is in the step position and the lower platform member is in the ramp position.

5. An apparatus according to claim 1, wherein the frame includes
a left support member;
a right support member; and
an at least one cross support extending from the left support member to the right support member and providing rigidity to the frame.

6. An apparatus according to claim 5, wherein the at least one cross support includes a slot.

7. An apparatus according to claim 6, wherein the upper riser includes a flange that inserts into the slot, thereby holding the upper platform member in the step position.

8. An apparatus according to claim 1, wherein the upper platform member includes a latching mechanism that releasably locks the upper platform member in the ramp position.

9. An apparatus according to claim 8, wherein the latching mechanism is a spring loaded ball configured such that the ball can retract into a recess and release the upper platform member.

10. An apparatus according to claim 1, wherein the apparatus's overall length is fixed.

11. An apparatus according to claim 1 further comprising a middle platform member having a middle riser and a middle runner.

12. An apparatus according to claim 11, wherein the middle riser and middle runner are movable between a ramp mode and a step mode, the middle riser:
   (i) fixedly supporting the middle runner against the frame when in the step mode, and
   (ii) being moveable from the fixedly supported position to permit the middle runner to move to the ramp mode.

13. An apparatus according to claim 12, wherein the upper and middle platform members are in the ramp position and the lower platform member is in the step position.

14. An apparatus according to claim 12, wherein the upper and middle platform members are in the step position and the lower platform member is in the ramp position.

15. An apparatus according to claim 12, wherein the upper platform member is in the ramp position and the middle and lower platform members are in the step position.

16. An apparatus according to claim 12, wherein the upper platform member is in the step position and the middle and lower platformi members are in the ramp position.

17. An apparatus according to claim 1, further comprising a foldable support member located at one end of the frame and having a folded-out and a folded-in position, the foldable support member orienting the apparatus at an angle when in the folded-out position.

18. An apparatus according to claim 1, further comprising a handle for carrying the apparatus.

19. An apparatus according to claim 18, wherein the handle is located on the frame.

20. An apparatus according to claim 1, wherein the upper and lower platform members are carpeted.

* * * * *